United States Patent [19]

Wiemeyer et al.

[11] Patent Number: 5,226,218
[45] Date of Patent: Jul. 13, 1993

[54] DEVICE FOR ATTACHING AN ELECTRICAL CONNECTOR TO AN ELECTRICAL LINE

[75] Inventors: Hans H. Wiemeyer, Gernsbach; Dieter Zimmer, Muggensturm, both of Fed. Rep. of Germany

[73] Assignee: Kabelmetal Electro GmbH, Fed. Rep. of Germany

[21] Appl. No.: 813,197

[22] Filed: Dec. 23, 1991

[30] Foreign Application Priority Data

Dec. 24, 1990 [DE] Fed. Rep. of Germany ....... 4041783

[51] Int. Cl.$^5$ .............................................. H01R 43/00
[52] U.S. Cl. ................................. 29/564.4; 425/129.1; 425/576
[58] Field of Search ................ 29/564.4, 876, 854; 425/576, 558, 129.1, 129.2

[56] References Cited

U.S. PATENT DOCUMENTS

| | | | |
|---|---|---|---|
| 3,224,043 | 12/1965 | Lameris et al. | 425/576 X |
| 3,555,609 | 1/1971 | Chu et al. | 425/576 X |
| 3,591,893 | 7/1971 | Vicini | 425/129.2 X |
| 3,835,445 | 9/1974 | Hardesty | 29/876 X |
| 3,900,278 | 8/1975 | Beck et al. | 425/129.1 X |
| 3,999,289 | 12/1976 | Büttner et al. | 29/628 |
| 4,351,629 | 9/1982 | Farrell | 425/576 X |
| 4,411,608 | 10/1983 | Yanagisawa | 29/858 X |
| 4,613,475 | 9/1986 | Hettinga | 425/576 X |
| 4,810,178 | 3/1989 | Pröll et al. | 425/576 X |

FOREIGN PATENT DOCUMENTS

| | | |
|---|---|---|
| 2440264 | 3/1976 | Fed. Rep. of Germany . |
| 3005511 | 8/1981 | Fed. Rep. of Germany ..... 29/564.4 |
| 3720041 | 12/1988 | Fed. Rep. of Germany . |
| 1341788 | 9/1963 | France ............................. 425/129.1 |
| 4481 | 11/1963 | Japan .............................. 425/129.1 |

*Primary Examiner*—William Briggs
*Attorney, Agent, or Firm*—Ware, Fressola, Van der Sluys & Adolphson

[57] ABSTRACT

A device for attaching an electrical plug connector to the end of an electrical line containing at least one core is presented. In this device, the line is transported with a cyclic advance through processing stations in which the core of the line is stripped of insulation and a contact element is applied to the conductor exposed in this manner. To produce an extruded protective body for the contact element, with maintenance of the cycle of the device, an injection molding unit is provided with a carrier (17) and at least one extruder (18, 22). The carrier is equipped with at least three injection molds (19) and is rotatable about an axis (A). The injection molds 19 are provided with inlet openings (20). The injection molds are fastened to the carrier (17) whereby they are separated from each other in a circumferential direction, at an identical distance from the axis (A) of the carrier (17). The extruder (18, 22) is displaceable in the direction of the carrier (17) and is arranged with its exit opening at the level of the inlet openings (20) of the injection molds (19).

1 Claim, 2 Drawing Sheets

DEVICE FOR ATTACHING AN ELECTRICAL CONNECTOR TO AN ELECTRICAL LINE

BACKGROUND OF THE INVENTION

1. Field of the Invention

The invention relates to a device for attaching an electrical plug connector at the end of an electrical line containing at least one core. The device transports the electrical line with a cyclic advance through a series of processing stations. The core of the electrical line has its insulation removed and a contact element is attached to the conductor of the core exposed in this manner. The last processing station is an injection molding unit in which a protective body of insulating material is molded around the contact element and the end of the electrical line.

The electrical plug connection can be a male plug or a female socket. Pins or bushings are attached to the conductor of the core as contact elements. An electrical line in which a male plug or a female socket is molded in an inseparable manner to one end is designated as a "fabricated" line. In such a line, the second end remains free as a rule. The fabricated lines are turned over, for example, as semi-finished products to the consumer industry, which attaches these to any desired electrical devices or instruments. For this purpose, it is necessary that the desired electrical connector be extruded onto the line at one end and that the other end of the line be prepared to be connected to the electrical device or instrument without additional effort. However, fabricated lines are also known in which electrical connectors are attached at both ends.

DESCRIPTION OF THE PRIOR ART

With the known device according to DE-OS 24 40 264, after the attachment of contact elements to the conductors of an electrical line, the protective body of a plug is extruded in a separate process, using the available injection molding machines. As a result, the overall operation of the known arrangement is expensive, because all of the processes required for the production of a fabricated line are not carried out in a fully automated manner.

In the known device according to DE-OS 37 20 041, the end of the line equipped with the contact elements is moved through at least two injection molding devices or extruders with a cyclic advance. A portion of the protective body to be produced is extruded by each extruder. The quantity of material used for each portion becomes sufficiently solid during the period determined by the cycle to be capable of further transport without danger of damage. A completely fabricated electrical line can be produced in one operation with this arrangement, but the expense is relatively high because a separate extruder is required for each portion of the protective body. In addition, each portion must be extruded with great care in order to produce a homogeneous protective body.

SUMMARY OF THE INVENTION

The present invention provides a device to produce a protective body as a homogeneous formation with maintenance of the manufacturing cycle and with reduced expense.

This device according to the invention includes an injection molding unit with at least one extruder. A carrier for the injection molding unit is equipped with at least three injection molds and is rotatable about an axis. The injection molds, each equipped with inlet openings, are fastened to the carrier. The injection molds are separated from each other in a circumferential direction and are an equal distance from the axis of the carrier. The extruder, which is displaceable in the direction of the carrier, is arranged adjacent the carrier whereby its exit opening is located at the level of the inlet openings of the injection molds.

With this device, it is possible to extrude the protective body to create an electrical connector on the end of an electrical line in a fully automatic manner. In using the device, the electrical line is processed with a cyclic advance. As a result of the rotatable carrier of the injection molding unit, to which at least three injection molds are attached, it is possible to process an electrical line equipped with contact elements by using the injection molding process for production of the protective body in each cycle of the device. Since the injection molds are fastened to the carrier and are rotated therewith, there is sufficient time to permit cooling of the injection molding material before ejection of the protective body. At the removal point where the injection molds are opened, a finished fabricated line can be removed during each cycle. At this point, the protective body is already solidified to such an extent that there is no danger of damage thereto.

BRIEF DESCRIPTION OF THE DRAWINGS

An exemplifying embodiment of the object of the invention is shown in the drawings.

DETAILED DESCRIPTION OF THE INVENTION

Figure 1:
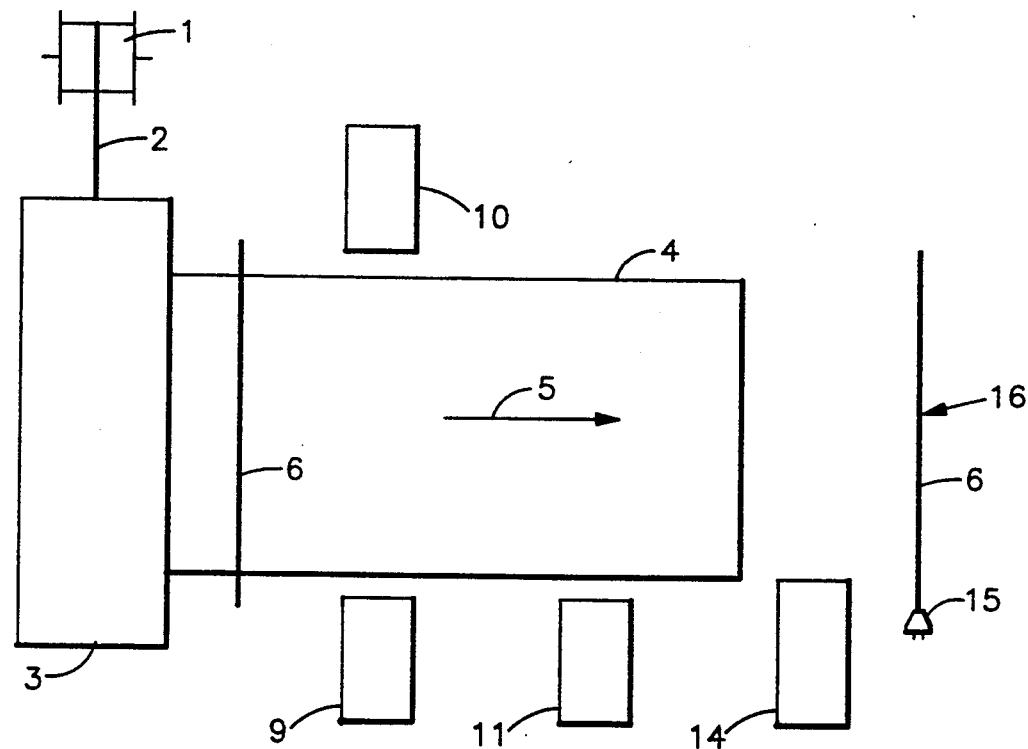
FIG. 1 is a schematic representation of the device according to the invention for attaching an electrical connector to an electrical wire.

An electrical line 2 is unreeled from a coil 1 and is fed to a cutting-to-length device 3. In the exemplifying embodiment shown and described below, line 2 has two cores. However, it can also have a single core or more than two cores. Connected to the cutting-to-length device 3 is a conveyor device 4 by which a cut-to-length line 6 to be processed can be transported in the direction of the arrow 5. A plurality of processing stations (9, 10, 11, 14), which can differ in number, are present along the conveyor device 4. Only the processing stations required for an understanding of the invention are shown in FIG. 1.

Figure 3:
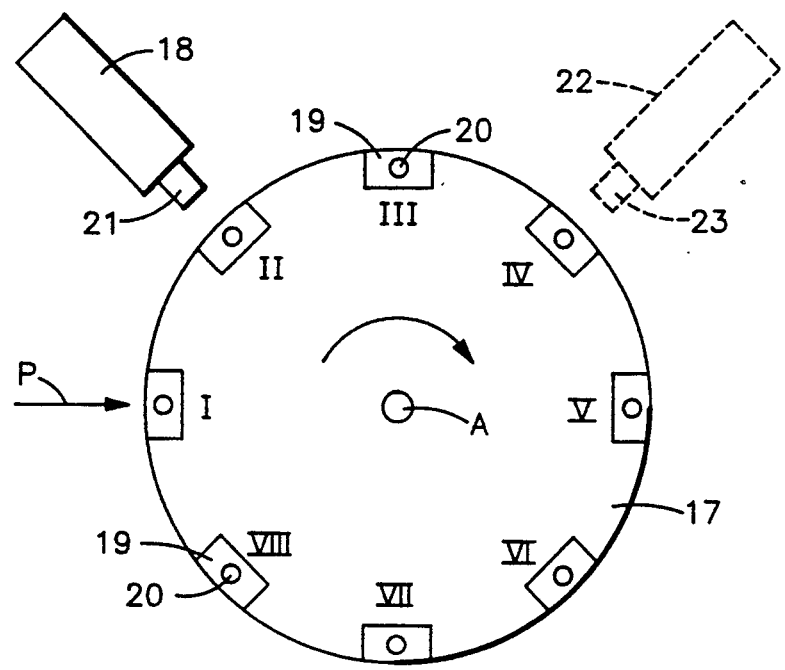
FIGS. 3 and 4 are schematic views of an injection molding unit used in the device.
Figure 4:
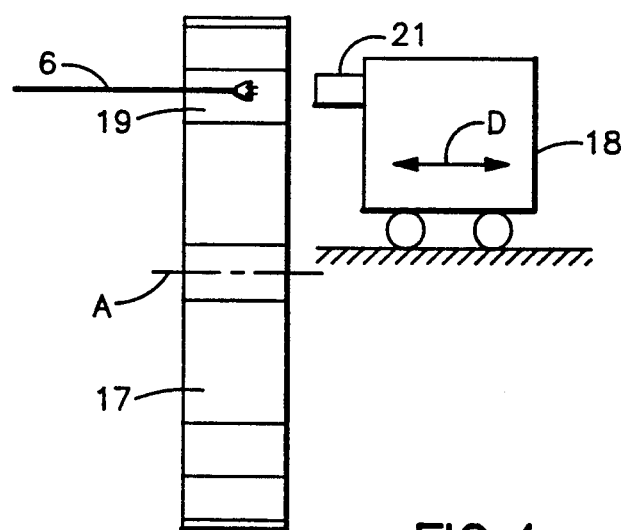

From the cutting-to-length device 3, there emerges the line 6, which has a preset length and can already have its ends stripped to expose the core 7, 8. However, it is also possible to strip the line 6 in a first station (not shown). The cores 7 and 8 of the line 6 exposed by the stripping have their insulation layers 7A, 8A removed in the processing stations 9 and 10, so that their conductors 7B, 8B are exposed. Plug pins 12 and 13 are connected as contact elements to the conductors 7B, 8B at one end of the line 6 in a processing station 11. The plug pins 12 and 13 can be grouped into a unit by means of a bridge of insulating material (not shown). At least this end of the line 6, prepared in this manner, is then moved into an injection molding unit 14, the detailed structure of which is shown in FIGS. 3 and 4. In the injection molding unit 14, a protective body 15 is molded around the end of the line 6 equipped with the plug pins 12 and 13. At the end of the entire device, a fabricated line 16 is then complete, which can be sold as a finished product. The fabricated line 16 shows an electrical plug connector on at least one end thereof.

The other end of the line 6, as a rule, has its insulation removed only in the processing station 10. It is then available for connection to electrical devices and instruments. In principle, however, contact elements can also be connected to this end--in a process analogous to that described for the first end of the line 6. The other end of the line could also be embedded in a protective body. An injection molding unit corresponding to the injection molding unit 14 can be used for this purpose.

Figure 2:
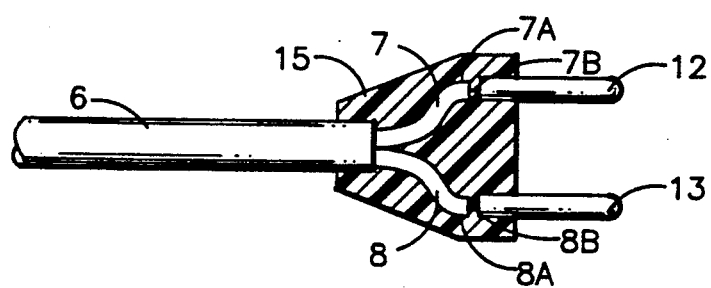
FIG. 2 is an elevational view in partial section of the end of the electrical line fabricated by the device.

With the device according to the invention, both plugs and sockets can be extruded at the end of a line 6 in a fully automatic manner. The detailed explanations herein are provided for the plug shown in FIG. 2. However, these explanations also apply to a socket in the same manner.

Turning now to FIGS. 3 and 4, the injection molding unit 14 indicated in FIG. 1 includes a carrier 17 rotatable about an axis A and at least one injection molding device 18, hereinafter again designated as "extruder". Attached to the carrier 17, at identical radial distances from the axis A, injection molds 19 are used to form protective bodies 15 about the end of the lines equipped with plug pins 12 and 13.

In a preferred embodiment, eight injection molds 19, displaced with respect to each other at positions I–VIII in a circumferential direction, are arranged on the carrier 17 as is shown in FIG. 3. Each injection mold 19 contains an inlet opening 20 through which the material for forming the protective body 15 can be injected. To accomplish this, the extruder head 21 of the extruder 18 is arranged so its exit opening is exactly at the level of the inlet openings 20. The extruder 18 is displaceable in the direction of the carrier 17, as is indicated by the double-headed arrow D.

The injection molding unit 14 according to the invention operates in the following manner. The end of the line 6 equipped with plug pins 12 and 13 is inserted in the direction of the arrow P into the opened injection mold 19 in the loading position I. The line 6 is kept as taut as possible during this process, so that it does not kink directly at the injection mold 19. In following the cycle of the device 4, the carrier 17 is rotated about an angle corresponding to the distance of the injection molds 19 from each other. The injection mold 19 with the inserted end of the line 6 thus moves into the position II. In this position, it is automatically closed and is filled by the extruder 18 with the injection molding material. The extruder 18 is moved up close to the carrier 17 into contact with the injection mold 19 for this purpose. After filling of the injection mold 19, the extruder 18 moves back into its starting position. The filled injection mold 19 passes cyclically through the positions III, IV, V and VI. During this time, the injected material of the protective body 15 has cooled adequately. The fabricated line 16 can be removed in the position VII from the injection mold 19, which is opened for this purpose. The injection mold 19 passes in the open form via the position VIII back into the loading position I.

In each cycle of the device 4, an end of a line 6 equipped with plug pins 12 and 13 is inserted into the injection mold 19, which is in the position I, so that, during each cycle, a fabricated line 16 can be removed in the position VII.

The course described for the eight injection molds 19 also applies to any other meaningful number of injection molds 19 fastened to a carrier 17. The fabricated line 16 could also be removed in a position ahead of position VII or in position VIII.

To increase the manufacturing rate, the injection molding unit 14 can also be equipped with a second extruder 22, which is shown by a dashed line in FIG. 3. This is installed in position IV and is displaceable in the same manner as the extruder 18.

The injection molding unit 14 supplemented in this manner operates in the following manner. A line 6 equipped with plug pins 12 and 13 is inserted in the opened injection mold 19 located in the loading position I. During the next rotation of the carrier 17, this injection mold 19 passes into position II. This is the position of the extruder 18, which initially remains passive during the start-up of the device described here. Before rotation, the injection mold 19 is closed as it passes from the loading position I to position II. In the loading position I, another line 6 is inserted into the injection mold 19 located there. Such loading takes place in each case after rotation of the carrier 17.

During the next step of the carrier 17, the injection mold 19, with the first inserted line 6, passes into position III while the injection mold 19 with the second line 6 goes to position II. During this step, the extruder 18 becomes active, so that the injection mold 19 in position II is filled as described above. During the next step of the carrier 17, the injection mold 19 with the first line 6 is filled by the extruder 22 in position IV. During this step, the extruder 18 is again passive.

During operation of the device, for each step of the carrier 17, only one of the two extruders 18 or 22 is active, in an alternating manner. For the injection molding process, they are moved up to the carrier 17, so that their extrusion heads 21 and 23 are in each case located at the inlet openings 20 of the injection molds 19. During the non-active period, the extruders 18 and 22 can, in each case, be prepared for another injection molding process. The device can therefore also be used in the case of a relatively short cycle time.

Thus, it can be seen from the foregoing specification and attached drawings that the device of the present invention provides a unique means for attaching an electrical connector to an electrical line.

The preferred embodiment described above admirably achieves the objects of the invention; however, it will be appreciated that the departures can be made by those skilled in the art without departing from the spirit and scope of the invention which is limited only by the following claims.

What is claimed is:

1. A device for attaching an electrical connector at an end of an electrical line containing at least one core, comprising:
   (A) conveyor device for transporting the line by cyclic advance;
   (B) means for removing an insulation layer from an end portion of each of the at least one core of the line to expose a conductor therein;
   (C) means to attach a contact element to each thus exposed conductor of the at least one core; and
   (D) an injection molding unit to produce a protective body of insulating material molded around each contact element and the end of the line, the injection molding unit having a carrier and at least one injection molding device, the carrier is rotatable about an axis and is equipped with at least three injection molds, each injection mold has an inlet opening, the injection molds are separated from each other in a circumferential direction and are at an equal distance from the axis of the carrier, the at least one injection molding device, which is displaceable in the direction of the carrier, is located adjacent the carrier whereby its exit opening is located at a level of the inlet openings of the injection molds and wherein the at least one injection molding device is two injection molding devices located at a distance from each other corresponding to twice the distance between two injection molds from each other in the circumferential direction and means for causing the two injection molding devices to be alternatively operable.

* * * * *